Feb. 2, 1965  H. W. RICHTER  3,168,617
ELECTRIC CABLES AND METHOD OF MAKING THE SAME
Filed Aug. 27, 1962  2 Sheets-Sheet 1
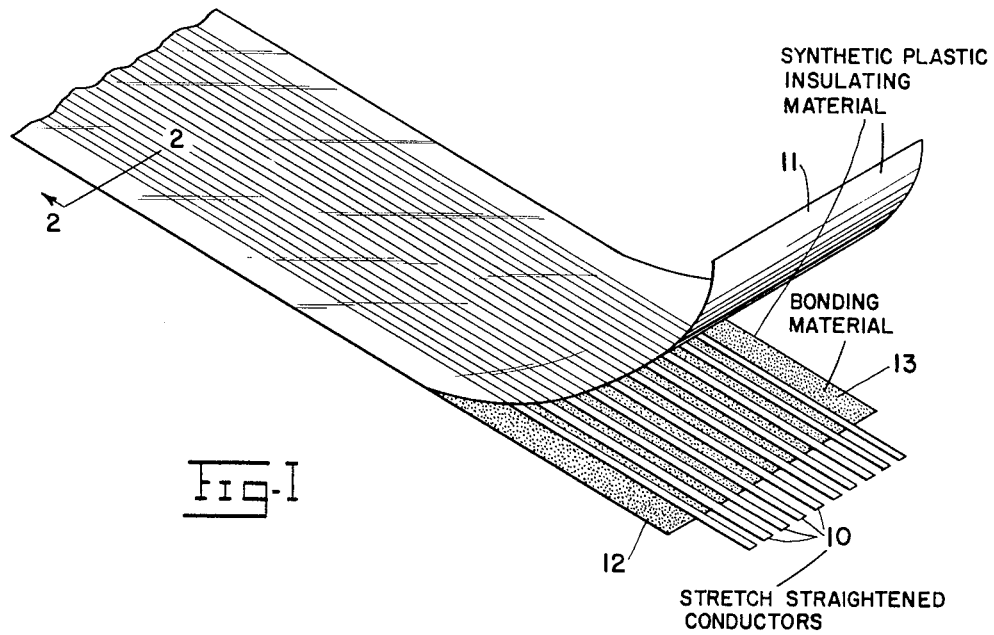
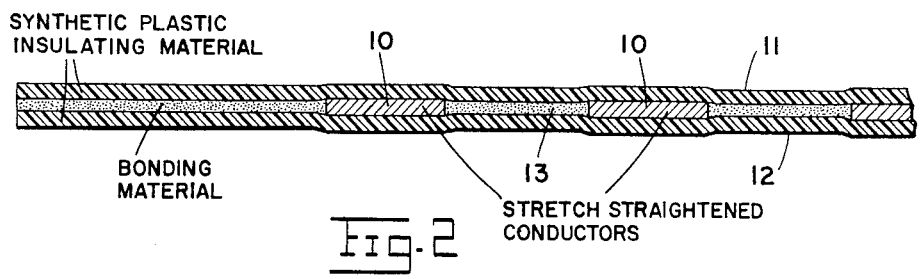
*INVENTOR.*
HERMAN W. RICHTER
BY
*HIS ATTORNEY.*

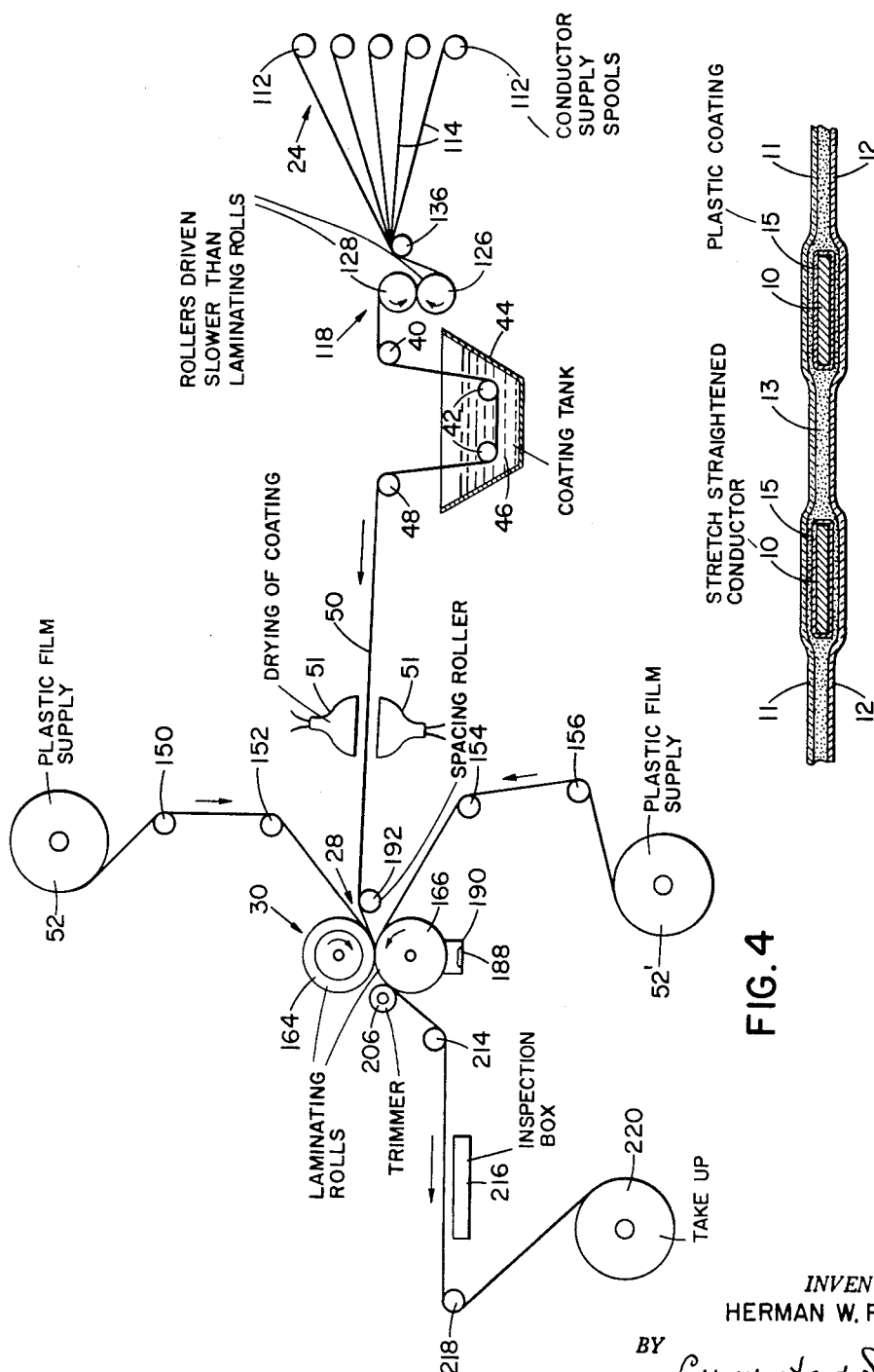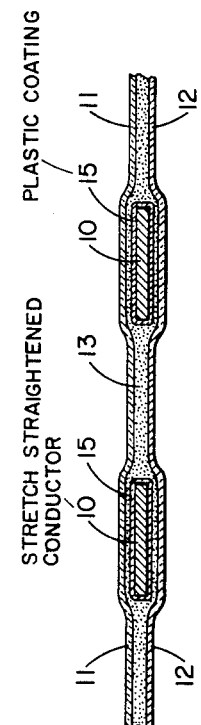

United States Patent Office 3,168,617
Patented Feb. 2, 1965

3,168,617
ELECTRIC CABLES AND METHOD OF
MAKING THE SAME
Herman W. Richter, Victor, N.Y., assignor to Tape Cable Electronics, Inc., Rochester, N.Y., a corporation of New York
Filed Aug. 27, 1962, Ser. No. 224,270
8 Claims. (Cl. 174—117)

This invention relates to electric cables and more particularly to multi-conductor electric cables that are designed for electrical and electronic applications. This application is a continuation-in-part of my earlier filed application, Serial No. 853,669, filed July 14, 1959, now abandoned, which was a continuation of my earlier filed application, Serial No. 605,628, filed Aug. 22, 1956, and now abandoned.

Conventional electric cable ordinarily comprises a strand or strands of copper or other metal wiring, encased within one or more coverings of insulating material. The number and nature of the coverings, the number of strands, and the kind of metal used, depend upon the electrical insulating and mechanical characteristics, load carrying capacity, and weight per unit of size or capacity, that are sought in the cable.

The tremendous developments and advances in printed circuitry and automation in recent years have developed a need for newer and different cable types, more compatible with the needs of modern circuitry.

Ribbon-like multi-conductor electric cables have several advantages for printed circuit applications, but have been made in the past, in some cases, simply by laminating ribbon-like conductors between thin sheets of transparent plastic material. Several difficulties were encountered, both in the manufacture of such cable, and in the cable itself. For example, the ribbon-like conductors unfortunately are characterized by "wander," that is, by a tendency to adopt a sinuous configuration in a horizontal plane; and many past attempts to produce flexible, ribbon-like cables by simple laminating techniques have been made difficult by the inherent tendency of the conductor ribbons to deviate from their desired respective positions because of the inherent tendency to "wander."

This tendency to "wander" is a disadvantage where the cable is intended for use in printed wiring applications. The recommended R E T M A grid pattern for printed wiring calls for a 0.100" center-to-center spacing between flat conductors. Since terminal jacks and interconnection devices of various kinds, as well as printed wiring boards, ordinarily conform to the recommended R E T M A grid pattern, it is essential from the practical standpoint that a ribbon-like multi-conductor electric cable also conform to the pattern.

For greatest acceptability, a multi-conductor flat cable should have optimum characteristics of resistance to abrasion, dielectric strength, tensile strength, and mechanical stability, and should be sufficiently rugged to be compatible with automation techniques. For example, in some applications, it is desirable to strip the insulating covering from one side of a multi-conductor ribbon-like electric cable, to expose the conductors on one side of the cable only, and to then subject the conductors to an acidic gold plate bath. Unfortunately, the bond between the conductors and the plastic materials, that have been used in the past, is unable to stand up in the bath, and separation has occurred between the conductors and the plastic film. Also, in ordinary use of the cable, corrosion has sometimes occurred because of the seepage of moisture between the conductor surfaces and the plastic envelope ("wicking").

Accordingly, one object of the present invention is to provide an improved electrical multi-conductor cable that has a practical and efficient construction and mode of operation, for use in present day circuitry.

Another object of the invention is to provide a practical electric cable of the character described, that is characterized by high tensile strength and that is readily flexible so that it may withstand repeated and severe vibrations or bending without damage.

Another object of the invention is to provide an improved flat, flexible multi-conductor cable that is free from "wicking."

Another object of the invention is to provide an electrical multi-conductor cable of the character described in which the electrical conductors are disposed so that the positions of the individual conductors respectively are readily ascertainable from external inspection of the cable.

A more specific object of the invention is to provide a flat multi-conductor electric cable in which ribbon-like conductors extend lengthwise of the cable and are disposed in a predetermined standard, parallel, spaced relationship relative to each other, and have predetermined standard dimensions, for ready alignment with and interconnection to other cables of a similar standard nature and, as well, various standard termination devices.

Another object of this invention is to provide a multi-conductor, ribbon-like electrical cable, and a method of making the cable, in which the individual conductors can be positioned relative to each other, in accordance with standard grid patterns for printed wiring, or in accordance with any other desired predetermined position arrangement of the conductors, with a high degree of precision.

A further object of the invention is to provide a flat multi-conductor electric cable of the character described, that can be used with printed circuit automation techniques.

Still another object of the invention is to provide a flat, flexible, multi-conductor cable that is characterized by an improved bond between the conductors and the plastic envelope in which the conductors are encased, that will withstand acid baths, soldering, and other automation and printed circuit techniques, without destruction of or material deterioration of the bond.

A more specific object of this invention is to provide a cable of the character described in which full advantage is taken of the best of the mechanical and electrical characteristics of different, carefully selected synthetic plastic materials, so as to obtain the ultimate in physical and electrical properties in the cable.

A related object of the invention is to provide a flat, flexible multi-conductor cable that has optimum characteristics of resistance to abrasion, dielectric strength, tensile strength, and mechanical stability.

Another specific object of the invention is to proivde a cable of the character described in which the individual conductors are precisely positioned relative to each other and relative to one lengthwise edge of the cable.

Other objects of the invention will be apparent hereinafter from the specification and from the recital of the appended claims. To these and other ends, the invention resides in certain improvements and combinations of parts, all as will be hereinafter more fully described, the novel features being pointed out in the claims at the end of the specification.

In the drawings:

FIG. 1 is a perspective view of an electric cable that is constructed in accordance with one embodiment of the present invention;

FIG. 2 is an enlarged fragmentary sectional view taken substantially along the line 2—2 in FIG. 1, looking in the direction of the arrow;

FIG. 3 is an enlarged fragmentary sectional view, similar to that in FIG. 2, but showing an electric cable that is constructed in accordance with another embodiment of the invention, and FIG. 4 is a schematic diagram illustrating one method of making an electric cable in accordance with the embodiment of the invention that is illustrated in FIG. 3.

One preferred embodiment of the invention, herein disclosed by way of illustration, comprises a plurality of ribbon-like conductors 10 of copper, Nichrome, or other suitable electrical conducting material, and a pair of insulating members 11 and 12 that are positioned on opposite sides of the conductors 10, as shown in FIGS. 1 and 2. The conductors 10 are held in position between the insulating members 11 and 12 by a suitable insulating adhesive 13, that also secures together the insulating members 11 and 12.

Conductors 10 are preferably of copper and are substantially rectangular in cross section. That is, I have found that the heat dissipating property, and thus the current carrying capacity, of a conductor is maximized when the surface area per cross sectional area is a maximum. Thus, when conductors are substantially rectangular in cross section they have a larger ratio of surface area to cross sectional area than is possible with a conventional circular conductor. The individual conductors preferably are between 0.001 and 0.005 inch thick with a minimum thickness of 0.0002 inch. Although the width of each individual conductor may vary according to the anticipated ampere load to be carried by the conductor, for conventional electronic and low current electrical applications I prefer to make each conductor between 0.010 and 0.250 inch wide.

I have found that it is difficult to accurately align a plurality of ribbon-like conductors and to hold the same in accurate alignment unless the conductors are extremely straight, and to this end, I have found that the individual conductors may be accurately positioned if they are straightened, as by stretching under tension, just prior to their being bonded to the insulating member or members. Thus, as explained more fully hereafter, the conductors are preferably stretch straightened just prior to their being brought into contact with the insulating member or members.

Insulating members 11 and 12 are preferably formed of a flexible material having high electrical resistance, high tensile strength, stability and long life. While members 11 and 12 may be made of a synthetic plastic material such as cellulose tri-acetate, polyvinyl chloride or polyethylene, I prefer to use a synthetic plastic material such as polymer of ethylene. More specifically, I prefer to use a polyester resin such as polyethylene terephthalate which is a polymer formed by the condensation of ethylene glycol and terephthalic acid and is commercially available under the trademark "Mylar." The above materials are preferably in the form of continuous, impervious, non-fibrous or mono-filament extruded films which are formed or cut into narrow ribbon-like strips.

I have found that there are many advantages if the insulating members are transparent or at least translucent so that the position of the individual conductors may be readily determined from an inspection of the cable. However, transparency or translucency is not absolutely necessary, for if the insulating members are opaque the position of each wire is still discernible to the eye because the wires form ridges or raised portions in the insulating members and are obvious when the ends of the cable are stripped. Cellulose tri-acetate, polyvinyl chloride, polyethylene and polyethylene terephthalate are available in transparent, translucent or opaque films and they all have high electrical insulating properties, flexibility, stability and long life, and therefore, are suitable for use as above.

The individual conductors are held in position between insulating members 11 and 12, and when members 11 and 12 are of "Mylar," they are bonded together by a suitable insulating and preferably transparent adhesive, such as that available from the DuPont Company under designation No. 4695. This adhesive is a polyester resin, soluble in a mixture of four parts dioxane and one part methyl ethyl ketone. The above adhesive has a melting point between 245 and 275° F., has high tensile strength, between 3,000 and 4,000 p.s.i., and good electrical insulating properties. The adhesive may be applied to one or both of the insulating members prior to bonding, or to the conductors themselves. While I prefer to use the above adhesive when insulating members 11 and 12 are of "Mylar," rubber-based cement may be used as the adhesive when members 11 and 12 are of tri-acetate or polyvinyl chloride. When members 11 and 12 are of polyethylene they are bonded together by the application of suitable heat and pressure because no satisfactory adhesives have been found for use with polyethylene. Although polyvinyl chloride may be bonded by adhesive, it also may be heat bonded or sealed by being subjected to suitable combination of temperature and pressure.

The cable is formed by pulling one insulating member in the form of a narrow sheet from a suitable supply roller or container. The other insulating member is similarly drawn from a suitable roller and the two members are brought together on opposite sides of conductors 10 forwardly of suitable pressure rollers. Conductors 10 are drawn off suitable spools or containers and are wound over a series of rollers which place the individual conductors under tension so as to cause an elongation in the conductors, thereby straightening each conductor. The conductors are accurately positioned by means of a guide roller which has suitable means for holding the conductors in predetermined position after which the conductors are drawn between insulating members 11 and 12. The insulating members are bonded together and conductors 10 held in position between the members by adhesive 13 which is placed on the inner opposing surface of one or both of the members prior to the insertion of conductors 10 between the members. Although I prefer to place adhesive 13 on one or both of members 11 and 12, the adhesive may also be placed on one or both sides of conductors 10 as an alternative or in addition to the above mode of construction. Regardless of the exact mode of applying adhesive 13, conductors 10 are positioned between members 11 and 12 with the conductors in substantially parallel alignment and in substantially the same plane. Thereafter, members 11 and 12 and conductors 10 are passed as a unit between suitable pressure rollers which cause adhesive 13 to bond the members together and to the conductors thereby completing the formation of the cable.

When the insulating members are of polyethylene or polyvinyl chloride, the adhesive may be omitted and the insulating members bonded together around the individual conductors by the application of suitable heat and pressure. The actual steps of heat sealing the polyvinyl chloride or polyethylene films by the application of heat and pressure are well known and any suitable combination of heat and pressure may be used.

In order for the copper conductors to be straightened by stretching, as above, the copper must be capable of withstanding an elongation of more than 1 percent and I have found it desirable to treat the copper, by rolling and annealing, so that it is capable of withstanding a 15 to 30 percent elongation. However, for the copper to have such a degree of ductility it must have a small grain pattern. Not only does the small grain pattern allow the copper to be stretch straightened, but it renders the copper capable of withstanding repeated bending or vibration without fracturing and thereby aids in producing a cable having a long life. While the copper must be capable of withstanding an elongation of more than 1 percent, the copper must have sufficient tensile strength so that it will not be fractured when the insulating members are removed, as by stripping, in preparing the cable for connection to electric or electronic devices.

Conductors 10, when viewed in cross section, have one dimension substantially greater than the dimension at right angles thereto. That is, as viewed in FIGS. 1 and 2, the width of the conductors is several times as great as their height. The conductors are preferably positioned in a plane parallel to their longer dimension, as can be seen in FIGS. 1 and 2, thereby producing a cable having a minimum thickness. In addition, the cable is substantially planar and its thickness is independent of the number of conductors. Since both the insulating members and conductors may be readily bent upwardly or downwardly, as viewed in FIG. 2, the insulating cable is also flexible in the above directions and is capable of withstanding repeated and severe bendings or vibrations without damage. While the cable may be readily bent or curved in the direction of the smaller cross-sectional dimension of the conductors, it is difficult to bend the cable in a direction at right angles thereto. However, flexibility in one direction is sufficient, for the cable may be readily bent around a right angle turn by merely giving the cable a one-half twist at the turn.

In addition to making the cable readily flexible in one direction, the above construction provides a cable which has a minimum dimension in one direction and is itself ribbon-like. As a result, the cable may be used where space is at a premium, for it may be passed through openings which will not accept a thicker conventional round wire or cable. The cable is particularly well adapted for attachment to flat or gradually curved surfaces, as by pressure sensitive or other suitable adhesives.

While I have shown the cable as comprising two insulating members 11 and 12 on opposite sides of the conductors, it is not necessary to provide two insulating members, for a plurality of conductors 10 may be fastened to a single insulating member on one or both sides thereof. It is contemplated that in most instances when only one insulating member is used, the conductors will all be on the same side of the insulating member and the cable will be as shown in FIGS. 1 and 2 with the exception that there will be only one insulating member and one side of the conductors will be exposed. Although such a cable would not be satisfactory under all conditions, there are many installations where the conductors can be left exposed on one side.

My cable may be readily prepared for connection to other electrical devices by merely stripping back a length of the insulating members from the free end of the cable. I have found that by making members 11 and 12 of any of the plastic materials listed above, instead of paper which has heretofore been used as insulation for various types of electrical wiring, my cable can be readily stripped by merely abrading away one or both of members 11 and 12 as by a fine abrading wheel. Members 11 and 12 are readily melted and the melted portions carried away by the abrading wheel, whereas if members 11 and 12 were made of paper they could not be removed in the same rapid manner without leaving a charred residue (carbon) which would short out the cable. Since the position of the conductors is carefully controlled relative to one another and relative to a side edge of insulating members 11 and 12, all of the conductors may be readily soldered at one time to another electrical device. Since the position of the individual conductors is accurately controlled, the user of the cable is assured of being able quickly and accurately to position each conductor in the cable relative to other multi-conductor devices having the same inter-conductor spacing.

Thus, it will be seen that my invention provides a cable which is light in weight and requires minimum space in one dimension. In a typical instance, my cable weighs only approximately ⅕ as much as a cable having the same number of conventional, round and separately insulated conductors capable of carrying the same ampere load as my cable. My cable is capable of carrying a higher ampere load per unit of cross sectional area and per unit conductor weight than can conventional cables.

In addition, my cable is very flexible and is capable of withstanding severe and repeated bending and vibrations without injury. Moreover, since the spacing between the conductors is carefully controlled, my cable has substantially uniform inductance and capacitance between adjacent conductors. Since the conductors are positioned in a plane parallel to their longer cross-sectional dimension, the cable has low inter-conductor capacitance.

One preferred method of manufacturing a cable in accordance with this invention is described in detail in my co-pending patent application, Serial No. 37,001, filed June 17, 1960. As is disclosed in that application, the method of producing the multiple conductor involves the steps of leading a plurality of the ribbon-like conductors through a lengthwise path in an aligned relation in which they are substantially coplanar and in parallelism in planar portions of the path; applying lengthwise tension to the conductors and elongating them sufficiently to eliminate "wander"; disposing the conductors transversely of the path in a predetermined spaced relation relative to each other; enclosing the spaced, aligned conductors between confronting surface portions of ribbon-like, flexible, electrical insulating material that forms the envelope, and then permanently sealing the conductors, while in the desired spaced, aligned relation, between the confronting surfaces of the envelope portions.

The elongation of the conductors that takes place, because of the applied lengthwise tension, is carefully controlled. The tension that is applied is deliberately adjusted to exceed the conductors' yield strength. The term "yield strength" is used to refer to the stress at which a conductor, that is under tension, yields markedly and becomes permanently distorted, without any increase in the applied tension. In the case of soft annealed copper, from which the conductors preferably are made, the yield strength ordinarily is in the range from about 5,000 p.s.i. to about 15,000 p.s.i.

Since elongation of the conductors causes a change in their cross-sectional dimensions, the elongation must be carefully controlled so that the conductors have the desired final dimensions. While elongations as low as 0.2% and as high as 30% have been employed and are satisfactory, best results are obtained when the elongation is in the range from about 0.5% to about 5% and a consistent and uniform elongation of less than 1% is preferred.

When the cable is intended for use with printed wiring, a standard conductor size is 0.0015 inch by 0.030 inch, and the conductors are arranged with 0.100 inch center-to-center spacing. With proper selection of the plastic film and plastic adhesive materials, it is possible to produce a cable, for printed wiring applications, having 30 individual conductors, yet so light in weight that a 100 foot roll weighs less than two pounds, and has a total thickness on the order of 0.008 inch.

In making the cable, the position tolerance of the conductors should be very small, and should be related either to one particular conductor or to a datum line, rather than to adjacent conductors, in order to avoid cumulative position errors. The cable structure, that has been described above and that is illustrated in FIG. 2 of the drawings, is designed to and will hold a tolerance of plus or minus 0.010 inch (0.2%).

In selecting the materials for use in manufacturing the cable, advantage should be taken of the characteristics of the many synthetic plastic materials that are available, in order to obtain optimum mechanical and electrical characteristics in the cable. For example, the sheet or film material that is selected for the envelope should be selected for high tensile strength, good abrasion resistance, good dielectric strength, and mechanical stability, so that the envelope can serve as the primary mechanical element of the cable. Other characteristics, such as resistance to penetration by water vapor, are also important. In general, the oriented synthetic plastic films, that possess high mechanical strength and stability, such as, for example, polyethylene terephthalate, and other similar materials including those previously mentioned, are excellent for use for the envelope.

In the embodiment of the invention that is illustrated in FIG. 2, the adhesive material preferably is selected so that it functions as the primary electrical insulation of the structure. Ordinarily, when the cable of FIG. 2 is produced by adhering together plastic films, the confronting surfaces of which are coated with layers of heat-activatable adhesive, some of the adhesive remains between the copper conductor surfaces and the adjacent surface portions of the plastic films, the amount of adhesive depending upon the pressure that is applied during the laminating period, the temperature, the time permitted for flow, and the like. The non-oriented thermoplastic materials possess characteristics that make them well suited for use as the adhesive material, and such materials, with melting points up to on the order of about 400° F., are satisfactory. Such materials include, for example, many different types of polyvinyl chloride and polyethylene, as previously disclosed.

The cable may be stripped on both sides for soldering, or on only one side for temporary or pressure connections. Where machines or abrading wheels are not available for stirpping, scissors may be used for hand stripping. A cable containing as many as 50 conductors may be treated as simply as a single wire, in terminating and in stripping. Moreover, when using the cable of this invention, when the conductors in the cable must be precisely positioned, for mating with contacts on printed wiring board, connectors, or another piece of cable, registering one conductor automatically places all of the other conductors in the cable in registry.

Referring now specifically to FIG. 3 of the drawings, the conductors 10 have applied thereto a coating 15 of a bonding composition. The coated conductors are held in position between the envelope portions 11 and 12 by a suitable electrical insulating adhesive 13.

The coating 15 preferably is a solvent-coated, plastic base composition that is strongly bonded to the metallic conductor surfaces and that is readily compatible with and adherent to the other components of the cable. One way in which this coating can be applied to the conductors, and in which the cable can be made, is shown schematically in FIG. 4.

The apparatus for making the cable is arranged and disposed so that the metallic conductor ribbons are continuously fed from supply spools, and coated, and so that films of the outer insulating material are also continuously fed from supply rolls, and are laminated about the coated conductors, and the lamination wound up on a take up roll, in a continuous operation. To this end, the apparatus is laid out to perform the desired operations in sequence.

Thus, referring now in detail to FIG. 4 of the drawings by numerals of reference, the supply spools 112 are mounted to supply the metallic conductor ribbons 114 to a roller assembly that is generally indicated by the numeral 118. This roller assembly consists of a spacing roll 136 and, spaced along the path of operation from the spacing roll 136, a pair of resilient rolls 126, 128, that are mounted to be adjustably spring-pressed into engagement with each other.

Following the roller assembly 118, an idler roll 40 is mounted to receive the metallic conductors to guide them downwardly and under a pair of spaced-apart bars 42 that are mounted within a coating tank 44 that contains a solution 46 of the coating composition. The bars 42 are disposed to be beneath the level of the solution 46. Another idler roll 48 is mounted above the tank 44 to guide the coated conductors 50, leaving the tank, between infrared lamps 51 to drive off the solvent from the coating.

A grooved roller 192 is mounted to receive the coated conductors 50 after drying. The grooves in the drum 192 are accurately machined to receive the coated conductors with the spacing between the conductors respectively that is desired in the cable. From the drum 192, the coated conductors are fed into the nip 28 between a pair of rolls 164, 166, that are a part of the laminating assembly 30. The upper roll 164 is formed with a resilient surface that may be provided by a rubber or other soft, resilient covering on the roll. The lower roll 166 is a hard roll and may be made of steel or some other equivalent material. These rolls 164, 166 are preferably adjustably spring-pressed into engagement with each other.

An electric heater 188, that is mounted in a reflective casing 190, is disposed beneath the lower roll 166 to heat the roll.

At one side of the path of travel of the conductors, a supply spool 52 is mounted from which a ribbon of the plastic film, that is to form the outer insulating covering or envelope of the cable, is fed around idler rolls 150, 152, and into the nip 28 of the laminating rolls. At the other side of the conductor path, a second supply 52' furnishes a second ribbon of the envelope material, that is led over the idler rolls 156, 154, into the nip 28 between the laminating rolls.

A pair of disk cutters 206, only one of which can be seen in FIG. 4, are mounted for resilient engagement with the lower, steel roll 166, to trim the marginal portions of the cable emerging from the laminating rolls.

An idler roll 214 is positioned to receive the trimmed cable, to guide it over an illuminated inspection box 216 to another idler roll 218, from which the cable is wound on a take up roll 220.

To make a cable, the same number of conductor supply spools 112 are employed as the number of conductors desired in the cable. The metallic conductors 114 are led from the supply spools 112 over the spacing roll 136, and thence under and around the lower roll 126, between the nip of the roll 126, 128, and then around and over the upper roll 128. The conductors are then passed over the idler roll 42, then beneath the bars 42 that are mounted in the tank 44 below the level of the solution 46 of the coating composition. Some of the coating composition solution remains on the conductors as they are withdrawn from the tank. The precise amount of the coating that remains on the conductors can be controlled by known techniques, by adjusting the solution concentration, temperature, the time of residence of the conductors in the solution, and the like.

The conductors are led upwardly out of the solution and over the idle roll 48 and are then passed through a drying zone in which the solvent is removed from the coating. This may be, as shown in the drawings, a zone in which heat is applied to the conductors by infrared lamps 51. If desired, to expedite drying, a forced draft of air may supplement the heat that is supplied by the lamps 51. After the coating is dry, the coated conductors are led over the grooved drum 192, and between the confronting surfaces of the ribbons from the supply rolls 52, 52', into the nip 28 between the laminating rolls 164, 166.

The laminating rolls 164, 166 are mounted to be engaged under substantial pressure, firmly to grip the assembly that is fed between them. Moreover, the laminating rolls are driven at a speed that is faster than the speed of the rolls 126, 128, respectively, so that the conductors 114 are elongated during their travel between these two sets of rolls. The difference in speed is adjusted to be sufficient to impart the desired elongation to the conductors.

The envelope ribbons that are led from the supply rolls 52, 52', preferably are formed from polyethylene terephthalate, and have their confronting surfaces coated with a thin layer of a heat-activatable, electrical insulating laminating adhesive. The lower laminating roll 166 is heated to a sufficiently high temperature by the heater 188 to soften the adhesive, and the pressure that is applied to the assembly that is fed between the laminating rolls 164, 166, unites the adhesive layers and firmly bonds together the adhesive layers and the coated conductors.

The cutting disks 206 are adjusted so that the edges of the cable are precisely trimmed to a desired predetermined width. Moreover, one of the edges preferably is precisely trimmed relative to the positions of the conductors in the cable, to form a datum line.

When the cable passes over the illuminated inspection box 216, a visual inspection can be made to determine that the cable is being produced in the desired manner.

The take up roll 220 can be operated to maintain the cable under slight tension, to keep the cable taut to facilitate inspection and winding.

A preferred coating material, for use in the dip-coating process just described and that is illustrated in FIG. 4 of the drawings, is a solution of a specially modified, vinyl chloride-acetate resin. This resin is a copolymer of medium molecular weight, that has a chemical composition of 86 percent vinyl chloride and 13 percent vinyl acetate, with interpolymerized maleic acid making up the remaining one percent. Good results have been obtained with a coating solution containing about 25 percent by weight of the resin, together with a small amount of a plasticizer such as, for example, tricresyl phosphate, appropriate solvents, and preferably, a corrosion inhibitor. One preferred corrosion inhibitor is triethyl amine, which may be incorporated in the solution in amounts up to about 1% by weight, and preferably, in the range from about 0.1% up to about 0.5%.

While the coating solution can be applied readily by dipping as described above, it can also be applied by spraying, roller-coating, and knife-coating, although dipping has many practical advantages. A strong bond develops between the coating and the surface of a conductor ribbon, upon which the coating is applied, upon air drying of the coating to remove the solvents. However, if desired, the coating may be heated sufficiently to soften or to fuse it, to improve the bond.

Moreover, while solvent-coated coatings are simple to apply and dry, and provide excellent bonds between the coating and the surfaces of the conductors, other coating materials as well as techniques are available that also afford excellent results. For example, the coating may be applied either in the form of a plastisol or an organosol, and very little modification of the process is required for the use of either of these types of coating compositions.

When the coating that is applied to the conductor, and the intended end use specifications for the cable, both permit, the coating may be applied as a relatively thick coating, and by selecting a material for the envelope of the cable that is compatible with the coating material and that bond directly to the coating material, a unitary cable can be produced by heat sealing the envelope material directly to the coating. Such a cable has great resistance to "wicking" because of the excellent bond between the coating and the conductor surfaces and the unified structure of the coating and the envelope.

In a preferred embodiment of the invention, in accordance with FIG. 3, the small grained copper conductors are covered with continuous coatings respectively of a composition of a polymer of vinyl chloride of the type previously described, that is, a copolymer of medium molecular weight and a chemical composition of approximately 86 percent vinyl chloride, 13 percent vinyl acetate, and one percent of interpolymerized maleic acid. This coating forms an excellent bond and while it is a good electrical insulating material, it is used primarily because of the improved bonding that is obtained rather than because of its electrical insulating characteristics. The peel strength is improved many times, over structures where the bonding coating is not used. The primary insulation in the cable is furnished by the layer 13 of a polyester adhesive, while the envelope is formed from a pair of webs 11, 12 of polyethylene terephthalate. Thus, three different synthetic plastic materials are employed in the manufacture of the cable, and each is employed because of its inherent properties and is used in a way to take best advantage of those inherent properties.

Corrosive attack on the metallic conductors is essentially completely eliminated, both beacuse the improved bond to the conductors prevents access of moisture to the conductor surfaces, and also because of the presence of the corrosion inhibitor that is incorporated in the bonding coating. Moreover, the bond is sufficiently good so that when the cable is stripped to expose one side of the metallic conductors, and is subjected to an acidic gold plate bath, the cable remains intact since the bond withstands attack by the acid plating bath.

To take advantage of the precision cut longitudinal edges of the cable, the cable can be polarized in any of several ways. For example, a small thread can be inserted along one marginal edge of the cable as it is manufactured. Alternatively, one surface of the cable can be printed with any desired indicia, with the same advantages.

The precisely located conductors and indexed marginal edge of the cable facilitate use of the cable in the automated operations for printed circuitry for which this cable excels.

While the invention has been described in connection with specific embodiments thereof, it will be understood that it is capable of further modifications, and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth, and as fall within the scope of the invention or the limits of the appended claims.

I claim:

1. A method of making a flexible, ribbon-like, multiple-conductor, electric cable of indeterminate length and having a plurality of parallel, accurately spaced, ribbon-like, metallic conductors enclosed in a flexible, plastic envelope, said method comprising:
   (a) leading said conductors through a longitudinal path so that said conductors are coplanar, parallel, and spaced from each other;
   (b) applying longitudinal tension in excess of yield strength to said conductors for elongating said conductors to stretch-straighten said conductors;
   (c) guiding said stretch-straightened conductors in an accurately controlled, predetermined, coplanar, parallel, spaced relation relative to each other;
   (d) enclosing said stretch-staightened, accurately spaced conductors between confronting surface portions of a ribbon-like, flexible, electrical insulating, plastic envelope;
   (e) securing said confronting surface portions to each other and to said conductors to form said cable; and
   (f) all of such steps being taken in continuous order.

2. An article made according to the method of claim 2.

3. A method of making a flexible, ribbon-like, multiple-conductor, electric cable of indeterminate length and having a plurality of parallel, accurately spaced, ribbon-like, metallic conductors enclosed in a flexible, plastic envelope, said method comprising:
   (a) leading said conductors through a longitudinal path so that said conductors are coplanar, parallel, and spaced from each other;
   (b) applying longitudinal tension in excess of yield strength to said conductors for elongating said conductors to stretch-straighten said conductors;
   (c) guiding said stretch-straightened conductors in an accurately controlled, predetermined, coplanar, parallel, spaced relative to each other;
(d) enclosing said stretch-straightened, accurately spaced conductors between confronting surface portions of a ribbon-like, flexible, electrical insulating, plastic envelope wherein said confronting surface portions are activatable by heat to become adhesive;
(e) heating said confronting surface portions to render them adhesive;
(f) pressing said confronting surface portions together and against said stretch-straightened, accurately spaced conductors to seal said conductors within said envelope to form said cable; and
(g) all of such steps being taken in continuous order.

4. An article made according to the method of claim 3.

5. A method of making a flexible, ribbon-like, multiple-conductor, electric cable of indeterminate length and having a plurality of parallel, accurately spaced, ribbon-like, metallic conductors enclosed in a flexible, plastic envelope, said method comprising:
(a) leading said conductors through a longitudinal path so that said conductors are coplanar, parallel, and spaced from each other;
(b) coating said conductors with a continuous, flexible, adherent, plastic bonding composition;
(c) applying longitudinal tension in excess of yield strength to said conductors for elongating said conductors to stretch-straighten said conductors;
(d) guiding said stretch-straightened conductors in an accurately controlled, predetermined, coplanar, parallel, spaced relation to each other;
(e) enclosing said stretch-straightened, accurately spaced conductors between confronting surface portions of a ribbon-like, flexible, electrical insulating, plastic envelope wherein said confronting surface portions are activatable by heat to become adhesive;
(f) heating said confronting surface portions to render them adhesive;
(g) pressing said confronting surface portions together and against said stretch-straightened, accurately spaced conductors to seal said conductors within said envelope to form said cable;
(h) trimming a longitudinal edge of said cable to a predetermined, accurately spaced, parallel relation with said conductors; and
(i) steps a, c, d, e, f, and g being taken in continuous order.

6. An article made according to the method of claim 5.

7. A method of making a flexible, ribbon-like, multiple-conductor, electric cable of indeterminate length and having a plurality of parallel, accurately spaced, ribbon-like, metallic conductors enclosed in a flexible, plastic envelope, said method comprising:
(a) leading said conductors through a longitudinal path so that said conductors are coplanar, parallel, and spaced from each other;
(b) coating said conductors with a continuous, flexible, adherent plastic bonding composition;
(c) applying longitudinal tension in excess of yield strength to said conductors for elongating said conductors to stretch-straighten said conductors;
(d) guiding said stretch-straightened conductors in an accurately controlled, predetermined, coplanar, parallel, spaced relation relative to each other;
(e) coating a surface of each of a pair of ribbons of a synthetic plastic, electrical insulating material with a heat-activatable adhesive material that is an electrical insulator;
(f) bringing said coated surfaces of said pair of plastic ribbons into engagement with opposite sides of said stretch-straightened, accurately spaced conductors;
(g) heating said coated surfaces of said plastic ribbons to activate said adhesive material;
(h) pressing together said plastic ribbons to secure said plastic ribbons to each other and to said conductors to form said cable;
(i) trimming an edge of said cable to a predetermined, accurately spaced, parallel relation with said conductors; and
(j) steps a, c, d, f, g, and h being taken in continuous order.

8. An article made according to the method of claim 7.

References Cited in the file of this patent

UNITED STATES PATENTS

| 890,988 | Kitsee | June 16, 1908 |
| 2,432,828 | Stone | Dec. 16, 1947 |

FOREIGN PATENTS

| 198,739 | Great Britain | June 1, 1923 |

UNITED STATES PATENT OFFICE
CERTIFICATE OF CORRECTION

Patent No. 3,168,617                 February 2, 1965

Herman W. Richter

It is hereby certified that error appears in the above numbered patent requiring correction and that the said Letters Patent should read as corrected below.

Column 10, line 63, for the claim reference numeral "2" read -- 1 --; column 11, line 2, after "spaced" insert -- relation --.

Signed and sealed this 17th day of August 1965.

(SEAL)
Attest:

ERNEST W. SWIDER
Attesting Officer

EDWARD J. BRENNER
Commissioner of Patents